July 13, 1965 H. L. GIWOSKY 3,194,115
DUAL SLIDE PROJECTOR WITH A SINGLE MAGAZINE
Filed July 26, 1962 15 Sheets-Sheet 1

INVENTOR.
HARRY L. GIWOSKY
BY
Bayard H. Michael
ATTORNEY

INVENTOR.
HARRY L. GIWOSKY
BY
ATTORNEY

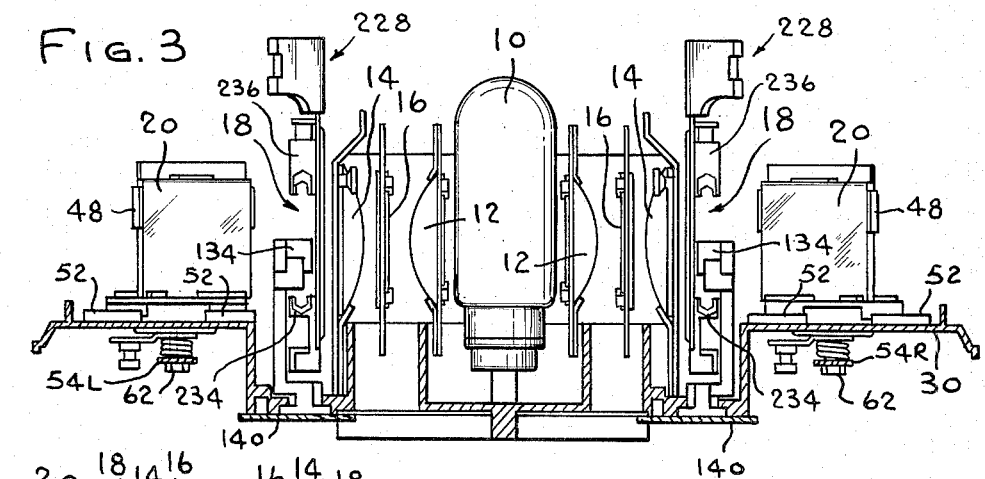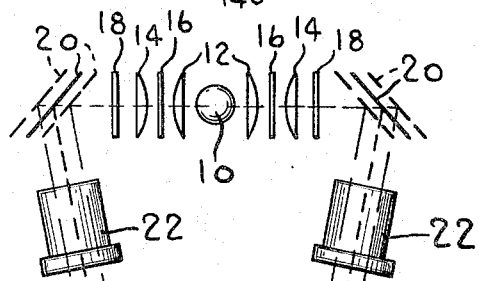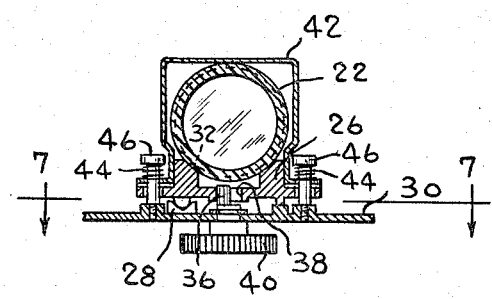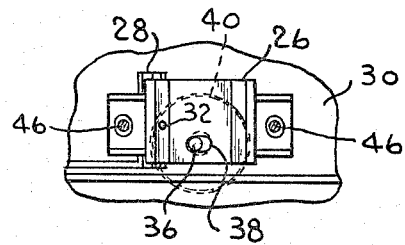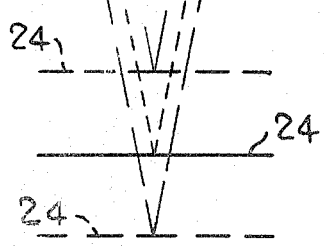

July 13, 1965  H. L. GIWOSKY  3,194,115
DUAL SLIDE PROJECTOR WITH A SINGLE MAGAZINE
Filed July 26, 1962  15 Sheets-Sheet 5

INVENTOR.
HARRY L. GIWOSKY
BY
Bernard H. Michael
ATTORNEY

July 13, 1965  H. L. GIWOSKY  3,194,115
DUAL SLIDE PROJECTOR WITH A SINGLE MAGAZINE
Filed July 26, 1962  15 Sheets-Sheet 6

INVENTOR.
HARRY L. GIWOSKY
BY Bayard H. Michael
ATTORNEY

July 13, 1965  H. L. GIWOSKY  3,194,115
DUAL SLIDE PROJECTOR WITH A SINGLE MAGAZINE
Filed July 26, 1962  15 Sheets-Sheet 7
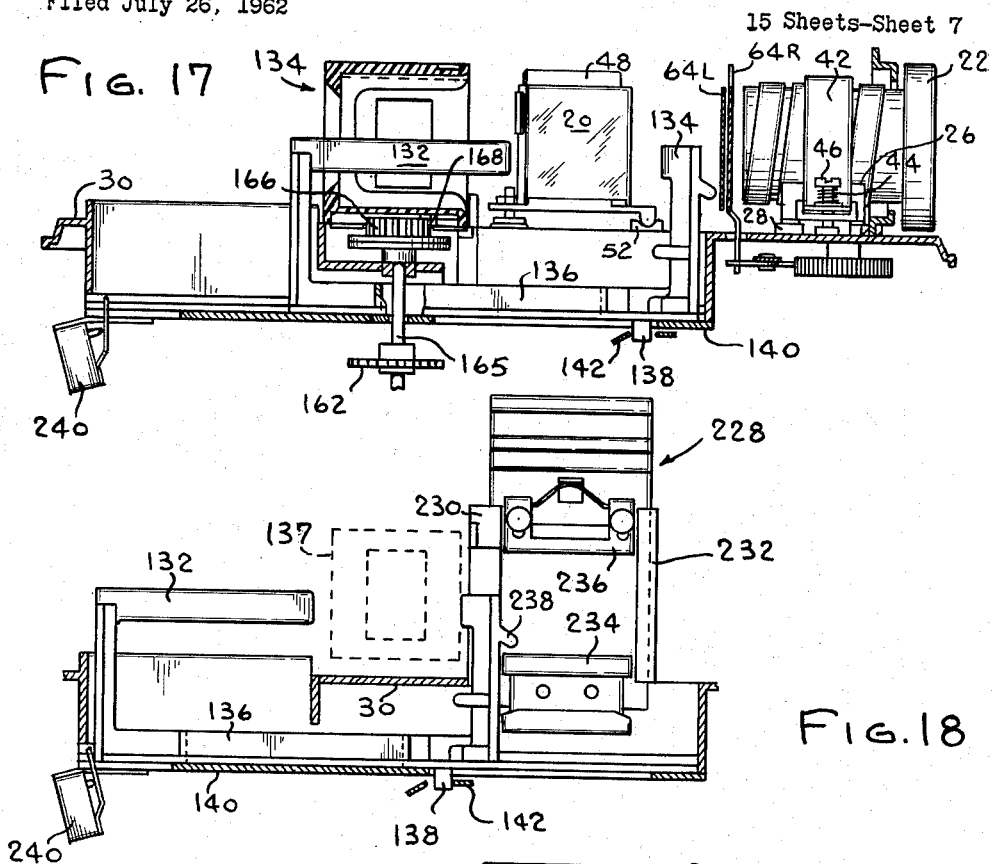
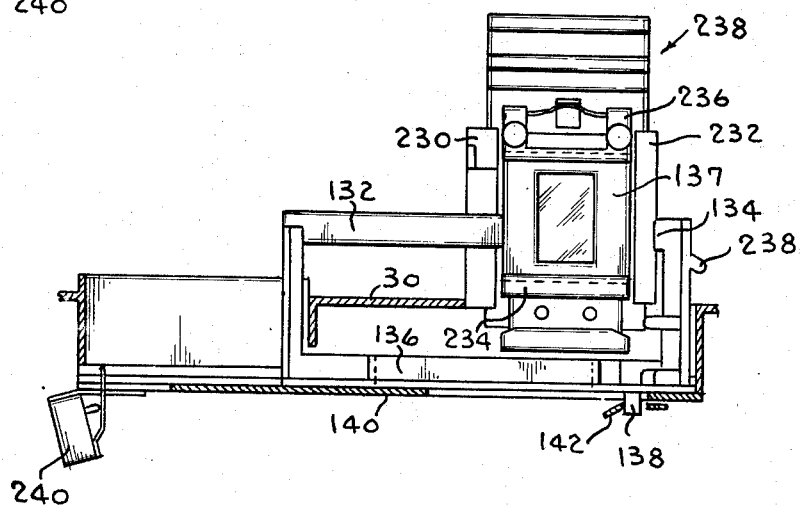
INVENTOR.
HARRY L. GIWOSKY
BY
Bayard H. Michael
ATTORNEY July 13, 1965  H. L. GIWOSKY  3,194,115
DUAL SLIDE PROJECTOR WITH A SINGLE MAGAZINE
Filed July 26, 1962  15 Sheets-Sheet 8
FIG. 25
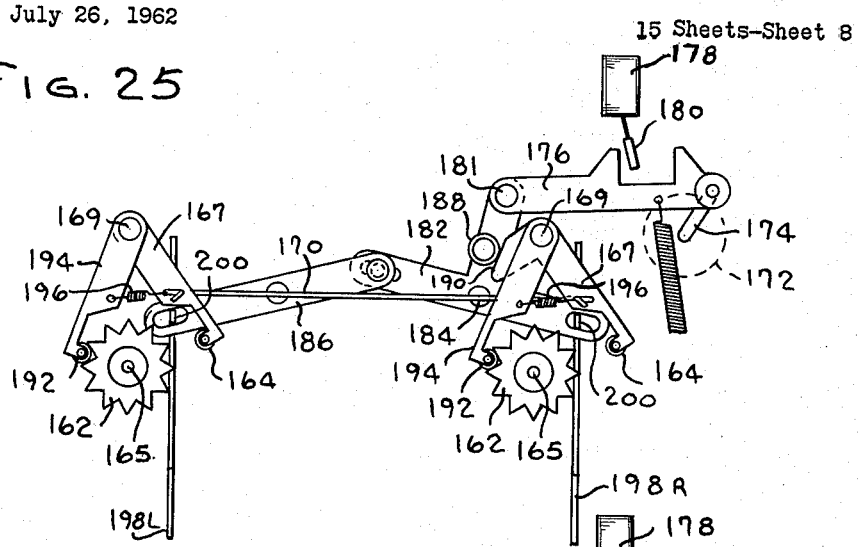
FIG. 26
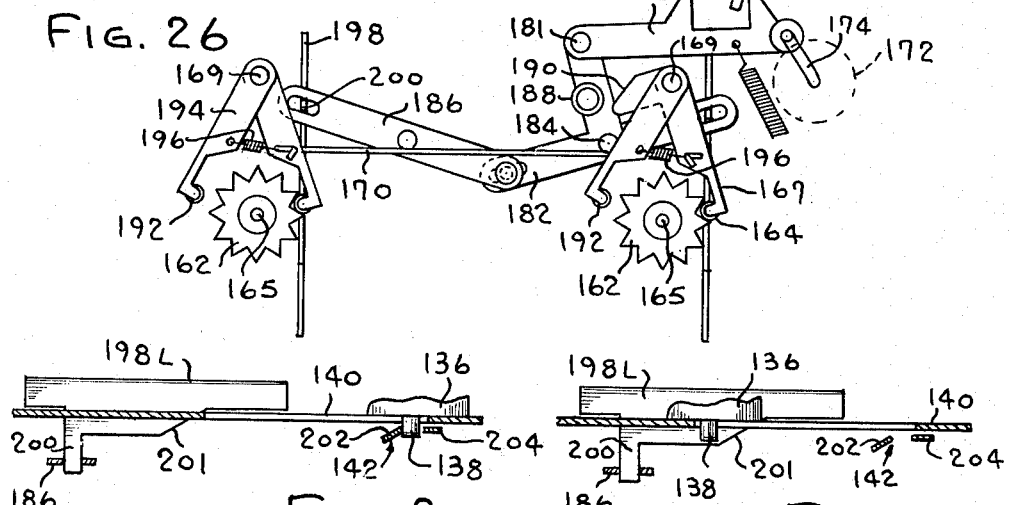
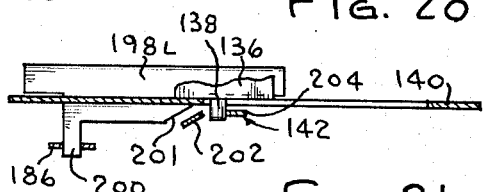
FIG. 20   FIG. 23
FIG. 21   FIG. 24
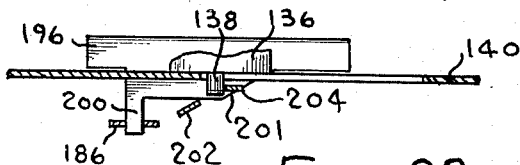
FIG. 22
INVENTOR.
HARRY L. GIWOSKY
BY
ATTORNEY

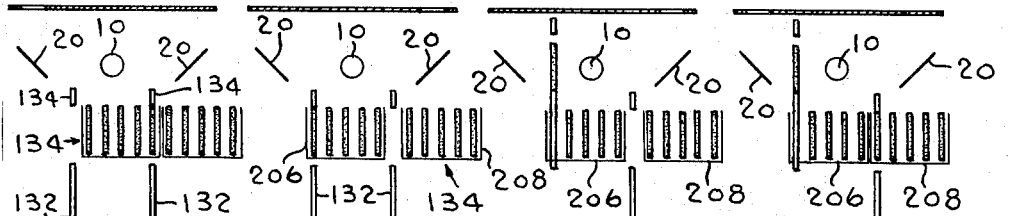
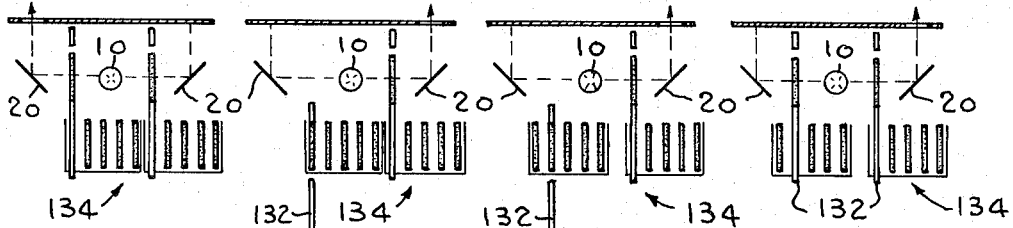
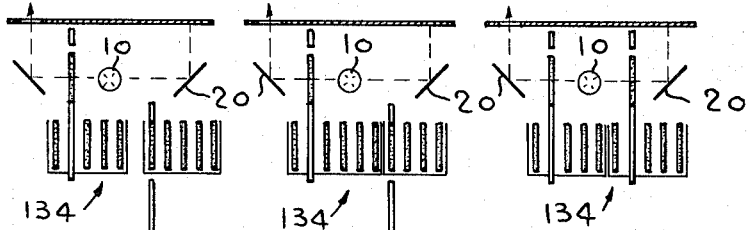
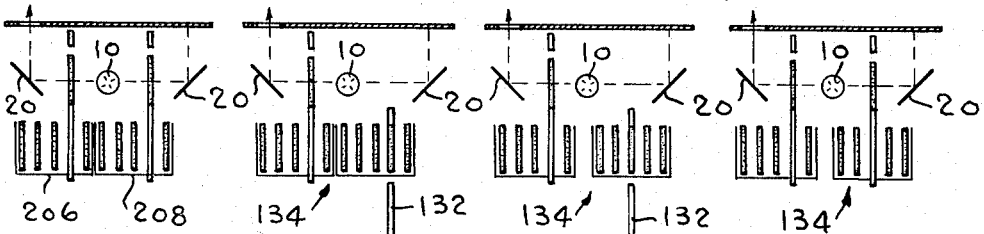
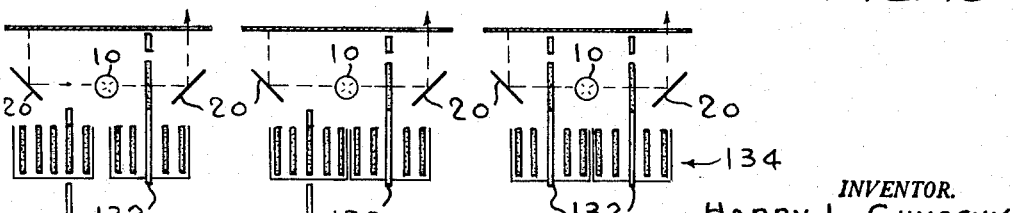

July 13, 1965    H. L. GIWOSKY    3,194,115
DUAL SLIDE PROJECTOR WITH A SINGLE MAGAZINE
Filed July 26, 1962    15 Sheets-Sheet 13

INVENTOR.
HARRY L. GIWOSKY
BY
Bayard H. Michael
ATTORNEY

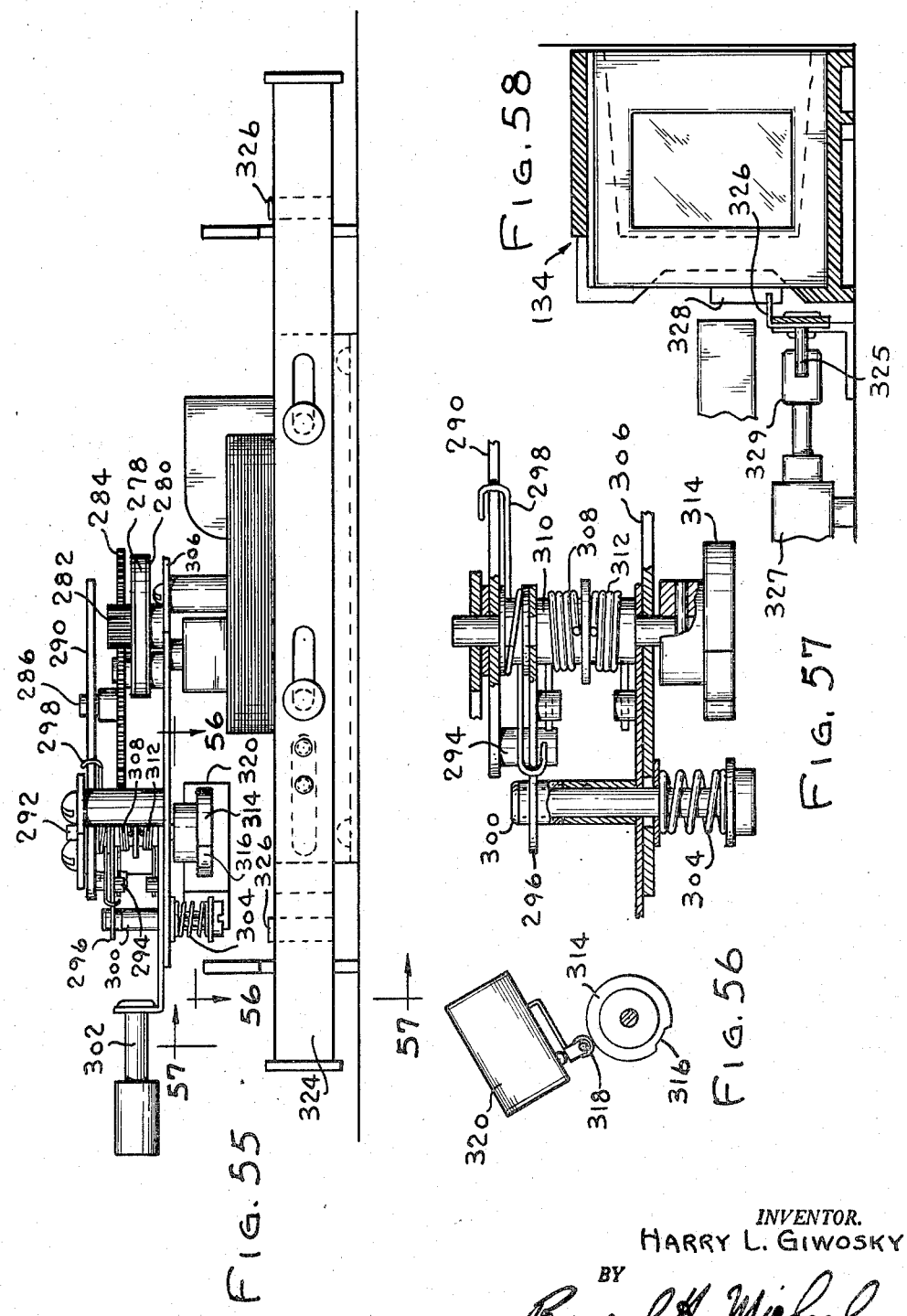

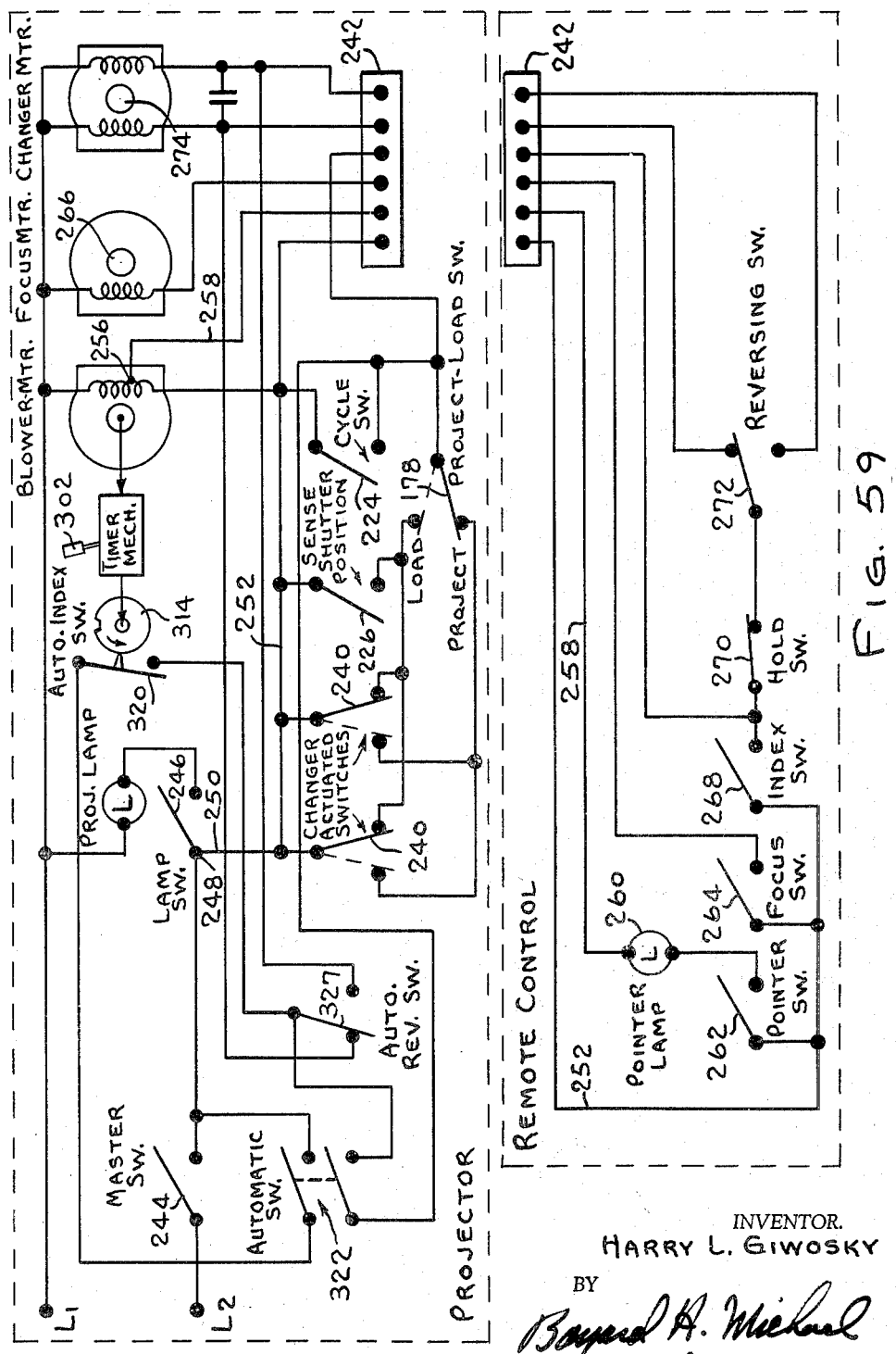

United States Patent Office 3,194,115
Patented July 13, 1965

3,194,115
DUAL SLIDE PROJECTOR WITH A SINGLE MAGAZINE
Harry L. Giwosky, Milwaukee, Wis., assignor to Realist, Inc., Menomonee Falls, Wis., a corporation of Delaware
Filed July 26, 1962, Ser. No. 212,683
20 Claims. (Cl. 88—28)

This invention relates to slide projectors and particularly to a slide projector giving an improved visual experience to the viewer by reason of the fact that the screen does not darken between slides (as usual in projectors to allow for slide changing).

In recent years much effort has been devoted to improving slide projectors but the effort has been directed towards simplification of the operation of the projector rather than improving the results on the screen. The viewer still sees a projected slide followed by a dark screen (during the slide changing) before the next slide is seen. In some projectors the screen stays illuminated while giving the viewer a chance to see one slide move sideways as the next comes into position. Of the two, it is generally considered better to darken the screen.

The principal object of this invention is to improve the projector to improve the results from the standpoint of the viewer.

Another object is to provide a projector in which one picture fades out as the next fades in whereby the effect is truly a picture change.

Another object is to accomplish the foregoing objects without sacrificing semi-automatic or fully automatic operation.

Still another object is to provide a slide magazine or tray for such a projector permitting a change of slides in one part of the tray while projecting a slide from another part of the tray.

In accomplishing the foregoing objects I provide a dual projection system whereby slides are projected from two projection stages through two optical systems (lenses). Only one lens is effective at one time with synchronized shutters being provided to control which of the two optical systems is effective. There is some overlap in the changeover from one lens to the other to insure against the screen going dark. This makes it possible to stop the changeover to achieve superposed images on the screen (a title on a scene, for example). The system is designed to use one projection bulb with mirrors used to turn each beam toward the screen.

Another object of this invention is to provide a simple focus system for a projector of the type described—this focus system being designed to both focus (in the image sharpness sense) and accommodate toe-in of the images so the two will fall in the same place in the screen. This system moves the mirrors to adjust the focus and toe-in simultaneously and in synchronism.

There generally is need to adjust the focus of the projection lens to accommodate slides having the film plane somewhat out of the norm. Another object is to make provision for such readjustment of the focus of the projection lens in use without affecting the adjustment of the lens not in use.

In a semi-automatic or fully automatic version of this projector there is need for controlling the timing of the change cycle of each change mechanism as well as making provision to clear the mechanism for slide tray insertion or removal. While the various complications of this type of movement control and interlocking are best explained in detail later, suffice it to say that provision for such control is an object here. Still another object is to provide control of the feed during a reversal of the feed direction. While this, too, is best explained later, suffice it here to say that the normal sequencing is not applicable during a reversal of feed.

Still another object is to provide a simple mechanism for editing slides at the projection stage. With this mechanism if the slide being shown is reversed or the like it can be directly removed to remedy the fault. Since this results in removal of the actual projection stage, provision is made to lock the stage in place except when the projector is set up for projection—thus guarding against loss or damage through inadvertent removal.

The foregoing represent the major objects of this invention although it will be obvious, as the detailed explanation proceeds, that many other objectives arose in order to carry out the purpose of this invention. Many design considerations heretofore lacking in the projector art had to be met and solved. All of these, then, comprise objects of the invention in greater or lesser degree and will be pointed out in or be apparent from the following specification taken in conjunction with the drawings in which:

FIG. 3 is a fragmentary elevation showing the projection bulb, condensing lenses, slide stage and the focusing mirrors;

FIG. 5 is a schematic diagram illustrating the manner in which the mirror movement accomplishes both control of focus and toe-in;

FIG. 6 is a fragmentary view showing the manner in which the focus system operates on the individual lens barrels;

FIG. 7 is a view taken as indicated by line 7—7 in FIG. 6 with the lens barrel removed to further illustrate the manner in which the focus of the individual projection lens is achieved;

Figure 14:
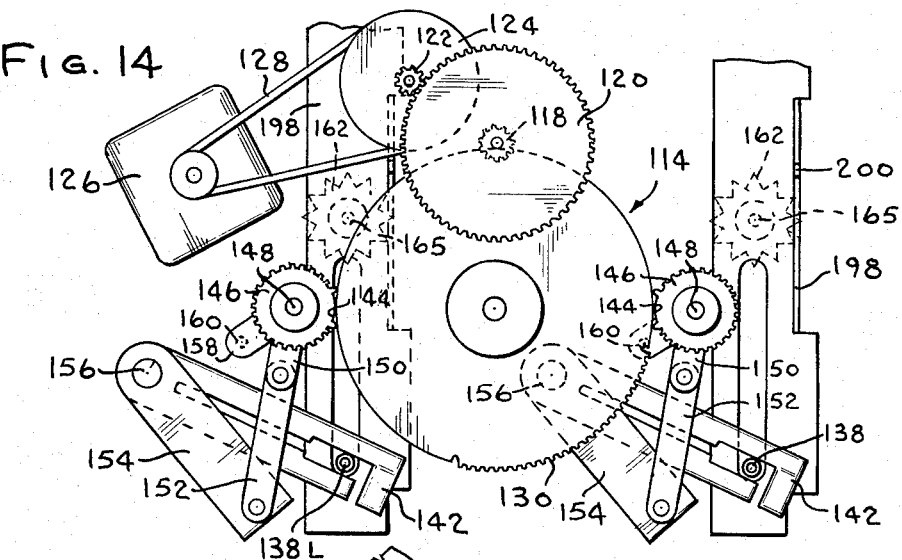
FIGS. 14, 15 and 16 are fragmentary views illustrating the manner in which the timing cam controls actuation of the slide changer and tray advance mechanism.
Figure 15:
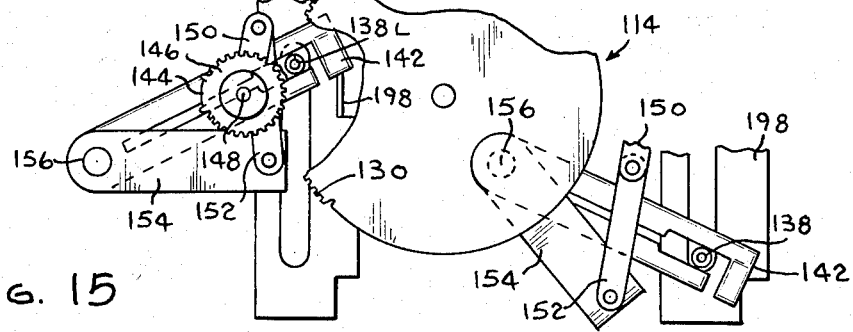
Figure 16:
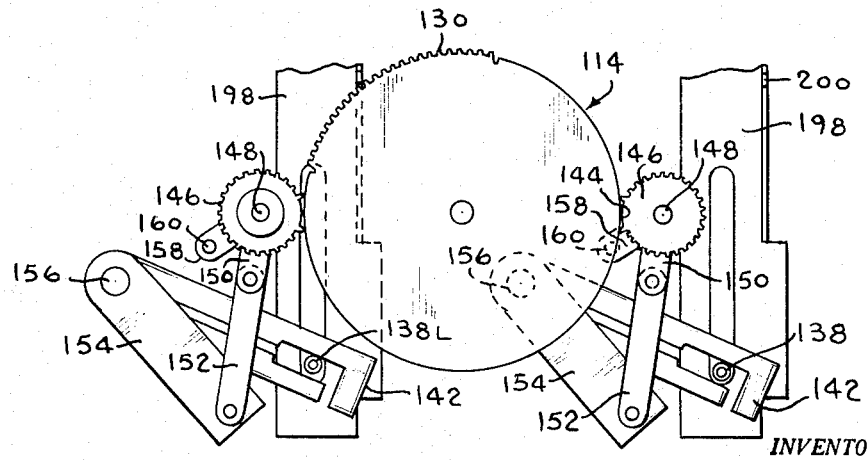
Figure 27:
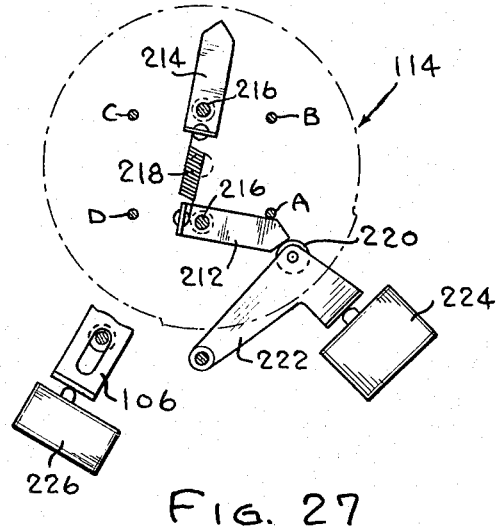
Figure 28:
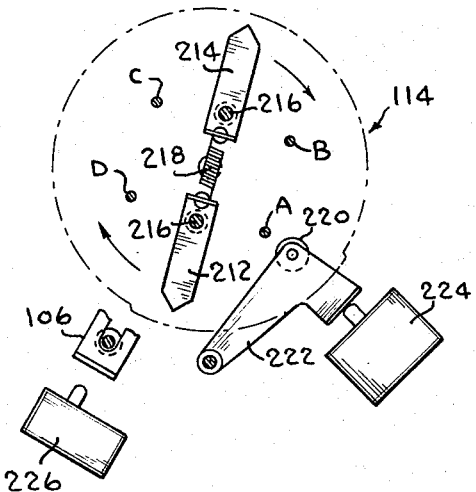
Figure 29:
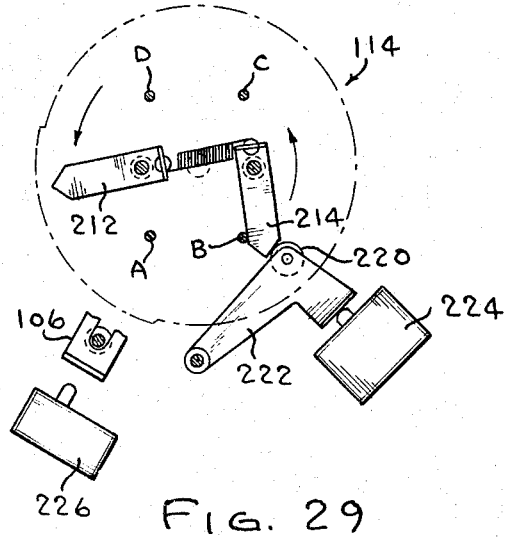
Figure 30:
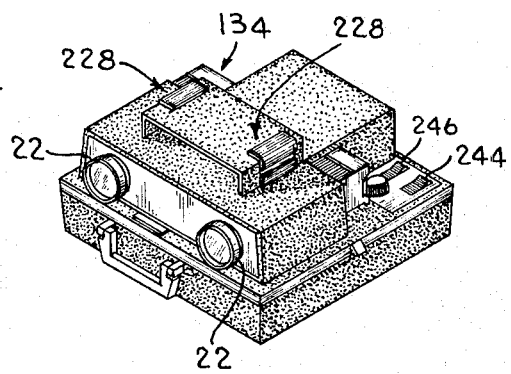

FIGS. 17, 18, and 19 are fragmentary views showing the motion of the slide changer in the positions corresponding to FIG. 14, the left part of FIG. 15 and of FIG. 16, respectively;

FIG. 20 is a fragmentary view illustrating the manner in which the changer actuator mechanism acts on the changer bar and is shown in the position normally occupied during projection;

FIG. 21 is comparable to FIG. 20 but shows the parts in the position occupied when normally retracted;

FIG. 22 corresponds to FIG. 21 but shows the parts in the position occupied when retracted for loading purposes and shows the manner in which the changer actuator is disengaged from the changer pusher;

FIG. 23 shows the next step in sequence following FIG. 22 wherein the normal drive mechanism has moved the changer actuator forward, that is, to the right, and has left the changer mechanism in the retracted position;

FIG. 24 shows the next step in the sequence where the changer actuator is being retracted to pick up the changer pusher;

FIGS. 25 and 26 show the load and project control in those respective positions and the manner in which the control affects, among other things, the position of the tray advance mechanism;

FIGS. 27, 28 and 29 show the timing controls carried by the master cam in the respective positions of forward advance (but at rest), the next position being during an advance motion, and the last position showing the manner in which the parts achieve a reversal in tray feed to effect a 270° motion of the master cam as opposed to the normal 180° motion;

FIG. 30 is a perspective view of the complete projector with the covers on;

FIGS. 31 through 48 illustrate various operations in the control of the feed of the slides and are, of course, schematic representations. The views are also used to illustrate the manner in which the shutters work. In FIG. 31 the power switch is on and the projector is set for loading so that both slide changers are in a retracted position allowing the slide magazine or tray to be inserted from the right side to the indicated position. The left shutter is open and the right shutter is closed.

In FIG. 32 the controls have been moved from load to project position and this results in opening the right shutter while closing the left shutter. The left magazine half is moved one step to the left putting slide No. 1 in loading position. At this instant both slide changers are still in the retracted position. In FIG. 33 the left side slide changer has moved forward placing slide No. 1 in projection position with the right shutter open and the right slide changer retracted. In FIG. 34 the right magazine half has moved one step to the left putting slide No. 2 in loading position and opening the left shutter. It will be noted the right slide changer is still retracted and the left slide changer is still forward. In FIG. 35 the right slide changer moves forward with the left shutter open to place slide No. 2 in the projection stage. Both slide changers are now in a forward position and in position for projection. The steps shown in FIGS. 32 to 35 are accomplished automatically when the control is changed from "load" to "project." The lamp may now be turned on and this will result in projecting slide No. 1 through the open left shutter.

In FIG. 36 the change or indexing switch is closed momentarily which causes the right shutter to open while closing the left shutter to project slide No. 2. While slide No. 2 is being projected the left slide changer moves back to return slide No. 1 to the magazine. In FIG. 37 the left magazine now moves one step to the left to put slide No. 3 in the loading position while the right shutter remains open and slide No. 2 is still projecting. In FIG. 38 the left slide changer now moves forward to place slide No. 3 in position to project and the right shutter is still open to project slide No. 2. The steps shown in FIGS. 36, 37 and 38 occur anytime the change switch is closed. In other words, while one slide is projecting the one that has just been projected is retracted, advanced to place the next slide to be projected in position, which slide is then moved into the projection stage.

In FIG. 39 the index switch is again closed opening the left shutter to project slide No. 3 while the right slide changer retracts and moves slide No. 2 to the magazine.

In FIG. 40 the right magazine portion moves one step to the left putting slide No. 4 into the loading position while slide No. 3 continues to project through the left lens.

In FIG. 41 the right slide changer moves forward to put slide No. 4 in projection position while the left shutter is still open projecting slide No. 3.

In FIG. 42 the parts have been moved to illustrate slide No. 7 being projected while slide No. 8 is in position to be projected next. The operator now decides he would like to go back to No. 6. The reverse switch is closed and the next time the index switch is actuated the reversal will be initiated.

In FIG. 43 the reverse switch has been actuated and with the subsequent actuation of the index switch the right slide changer moves back to return slide No. 8 to the magazine with the left shutter still open and still projecting slide No. 7 on the screen. In FIG. 44 the right magazine part moves one step to the right to return slide No. 6 into loading position. The left shutter is still open and still showing slide No. 7.

In FIG. 45 the right slide changer now moves forward to place slide No. 6 in projection position while the left shutter remains open, projecting slide No. 7.

Now in FIG. 46 the left slide changer moves back returning slide No. 7 to the magazine and opening the right shutter to show slide No. 6. In FIG. 47 the left magazine now moves to the right one step to put slide No. 5 in the loading position. The right shutter is open showing slide No. 6. In FIG. 48 the left slide changer now moves forward slide No. 5 in the projection position while the right shutter remains open and slide No. 6 is showing on the screen. If now the operator wanted to resume the normal sequence he would again reverse the reversing switch. Otherwise, on subsequent operations he will back up the cycle.

Figure 49:
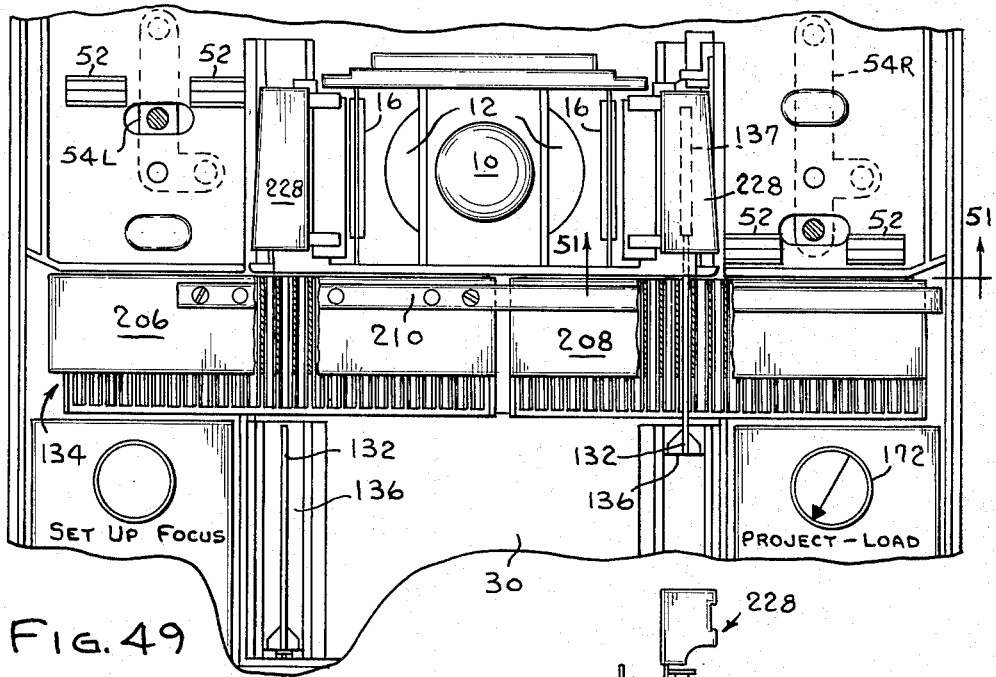
Figure 50:
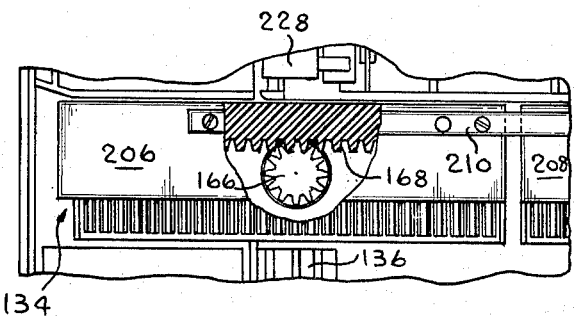
Figure 51:
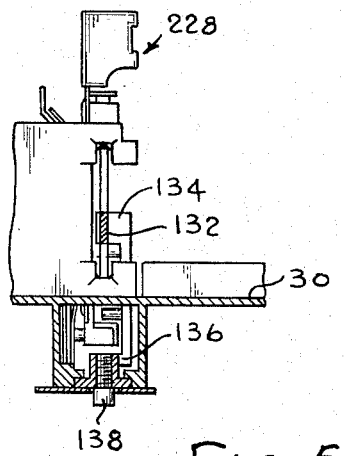
Figure 52:
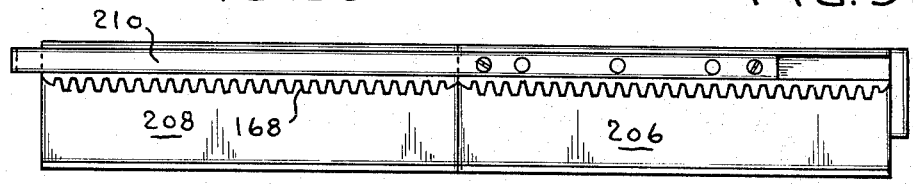
Figure 53:
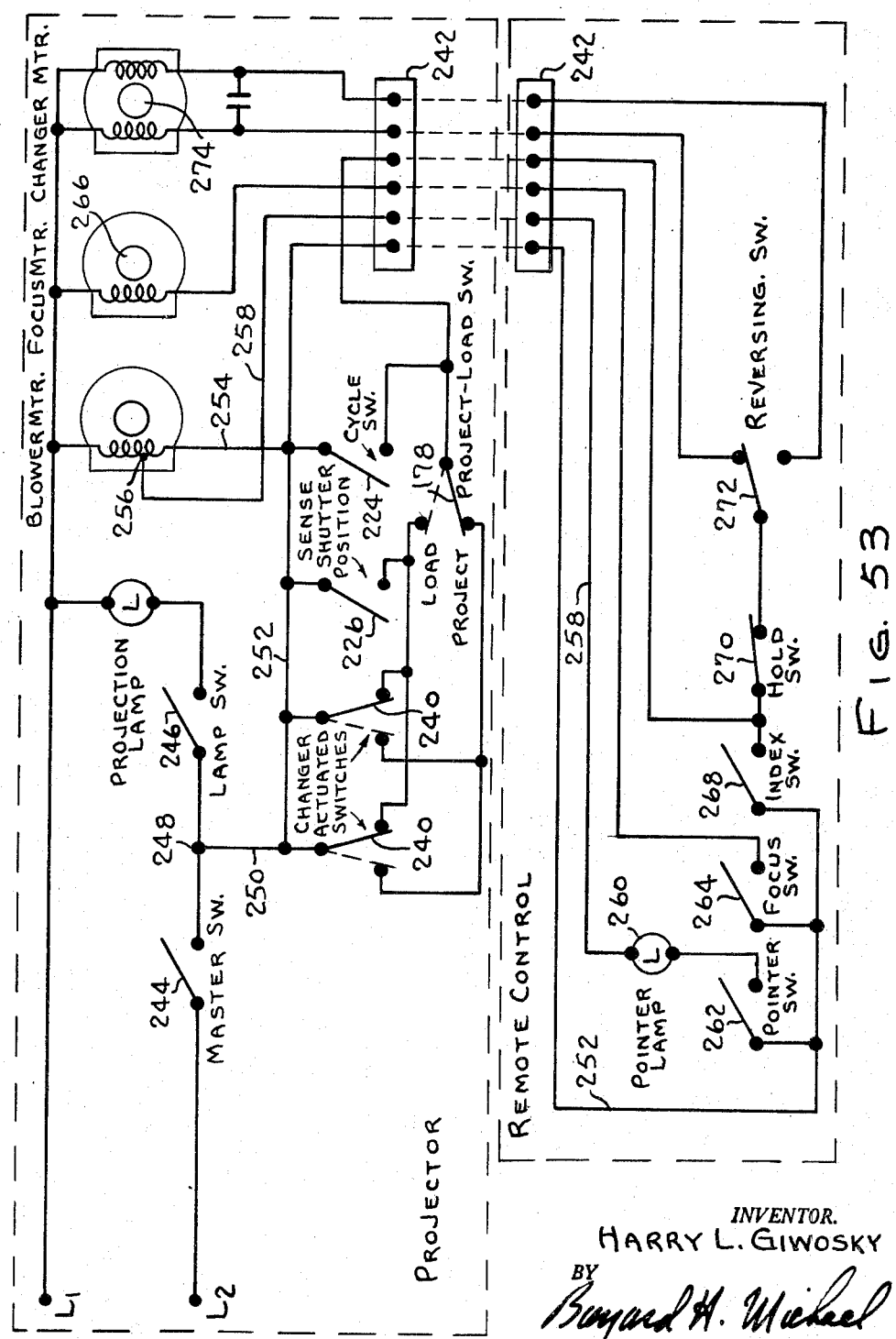
Figure 54:
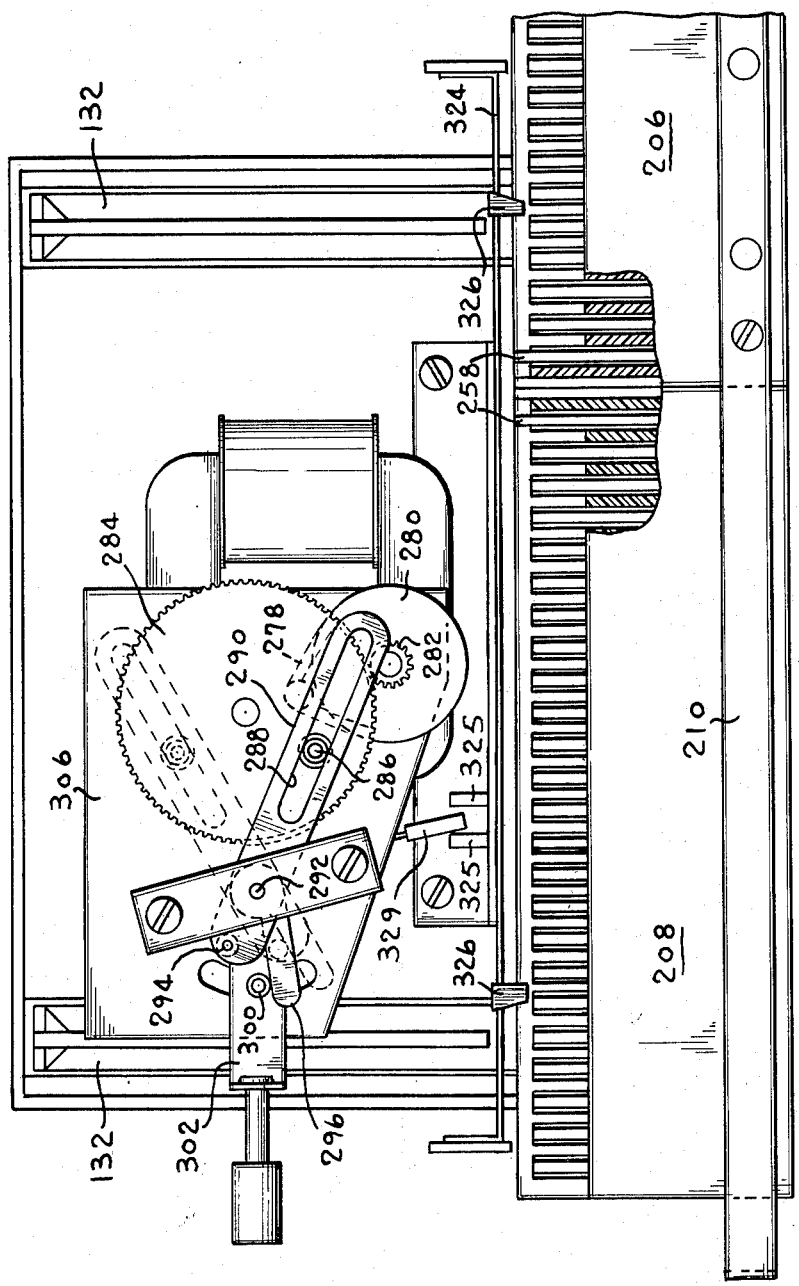

FIG. 49 is a fragmentary plan view showing the manner in which the unique slide magazine or tray fits into the projector;

FIG. 50 is a fragmentary portion of FIG. 49 with parts broken away to show the manner in which the tray advance gear engages the rack on the underside of the tray;

FIG. 51 is a fragmentary section taken as indicated by line 51—51 in FIG. 49;

FIG. 52 is a bottom view of the slide tray;

FIG. 53 is a wiring diagram for the projector;

FIG. 54 is a fully automatic version of this invention and is a plan view of a fragment of the projector;

FIG. 55 is a fragmentary view showing the structure which may be added to render the projector fully automatic and capable of re-cycling itself;

FIG. 56 is a fragmentary view as indicated by line 56—56 on FIG. 55;

FIG. 57 is an enlarged fragmentary view taken as indicated by line 57—57 on FIG. 55;

FIG. 58 is a view showing the manner in which a special reversing slide can be used to trip the automatic mechanism; and FIG. 59 is a wiring diagram of the fully automatic projector.

The present projector is, in a sense, truly two fully synchronized and integrated projectors operating from a single light source so that images may be projected through the projectors alternately. Thus the projector is provided with a single bulb 10 to pass light to the left (in FIGS. 1 and 3) through condensing lens 12, 14 and heat absorbing glass 16 through a slide located at the projection stage 18 or to the right through similar condensers and heat absorbing glass and projection stage. The light thus transmitted through the slide at the projection stage strikes the front surface mirror 20 to be redirected through the lens system contained in lens barrel 22. This projection system is schematically shown in FIG. 5 in which the toe-in to the projection screen 24 is exaggerated. This figure also illustrates the manner in which the mirror 20 is moved to change the focus of the projector. As will be readily appreciated, this is distinct from the usual arrangement in which the lens barrel 22 would be moved, although the net effect is the same from the standpoint of one-half of the projection system. However, by predetermining the toe-in of the projection lenses 22 so as to fall within the desired range of projection distances the movement of the two mirrors can be synchronized so that the projected image from either side will fall in precisely the same area on the screen with the result that there is no image shift as the projected picture changes and the eye is subjected to a minimum of strain. Another advantage is that the two images can be superimposed, where this may be desired, to place a title, for example, on top of a scenic picture. The mirror movement is not adequate to place the image too far off the optical axis of the projection lens to be accommodated by the lens.

The toe-in of each projection lens is determined by the fact that the bed 26 upon which the barrel is rotatably supported is guided by the V-groove in land 28 cast integral with the platform 30 of the projector. This bed 26 includes a pin 32 (see FIG. 7) which will engage the spiral groove 34 in the lens barrel to cooperate therewith to give a threaded action permitting initial adjustment of the two lenses to achieve superposition of the images on the screen as compatible with the pre-established toe-in of the two lens barrels. The bed 26 is free to move back and forth as guided by the V-groove within a small range of movement as determined by engagement of eccentric pin 36 in oblong slot 38 in the bed 26. This pin is eccentric about the axis of gear 40 which depends from and is rotatably mounted in the platform 30. When this gear is rotated, by means to be described hereinafter, a fine adjustment (or readjustment) of the focus of the associated lens will be obtained as the eccentric pin 36, working in cooperation with slot 38, forces the bed 26 back and forth along the axis determined by the V-groove guiding of the bed 26. The whole lens barrel is held down on the bed 26 by bracket 42 resiliently bearing downward on the lens barrel by reason of the action of compressed springs 44 acting between the bracket and the underside of the heads of the mounting screws 46.

Each front surface mirror 20 is supported in a bracket 48 fixed on the top of a bed 50 which is guided in much the same manner as the lens bed is guided, that is, by means of a V-groove in the surface of land 52 cast on platform 30 (as best seen in FIG. 17). Thus, the bed 50 is constrained to linear motion. It will be noted the guide groove is on the front of the right-hand platform and on the rear of the left-hand platform. The opposite side of the platform 50 is provided with a pin 62 which depends through the platform and engages an elongated slot in the pivotally mounted levers 54R and 54L. These levers are interconnected by a rigid link 56 to insure proper relationship of the levers at all times. The levers are actuated by means of the flexible wire 58 wound around the focus knob shaft 60 and around suitable guide posts and pulleys and terminating at the levers. When the knob is turned the forward ends of the levers 54L and 54R will move in the same direction but, by reason of the engagement of the pin 62 with the opposite sides of the pivots of the levers, the mirror platforms will move outwardly or away from each other simultaneously or towards each other simultaneously and with a linear motion. This will achieve a simultaneous change in the projected images of the two lenses. Normally after the projector has once been set up, that is, the two lens barrels rotated to properly adjust them, the only adjustment that is made when setting up the projector for subsequent use is to turn the focus knob. There is, of course, always the possibility of fine adjustment by actuation of the gear 40 by means to be described hereinafter. It will be appreciated that since the mirrors are moved synchronously the projector, when properly set up, will superpose the images at any distance.

As thus far described it will be apparent that the present projector employs a single bulb to project through two different projection stages and two different optical systems. From the description up to this point it will be apparent that both of these images would fall on the screen simultaneously if there is no means of controlling which image is to be projected and this brings us to a consideration of the shutter mechanism and the synchronization of the shutter mechanism to the operation of the projector.

Figure 1:
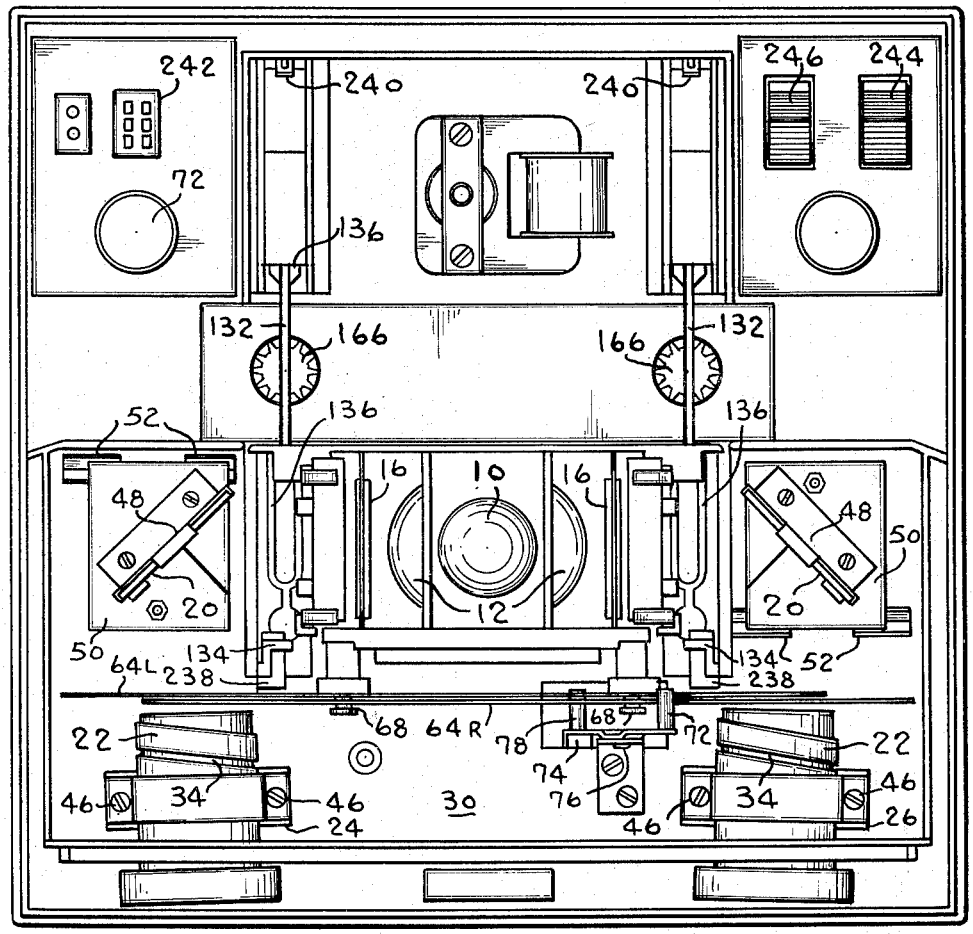
FIG. 1 is a top view of the projector with the cover removed and without a slide tray in the projector.
Figure 4:
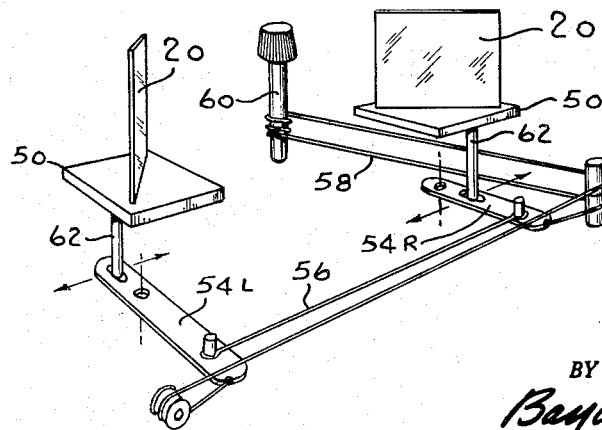
FIG. 4 is a schematic perspective illustrating the manner of simultaneously actuating the focusing mirrors.
Figure 12:
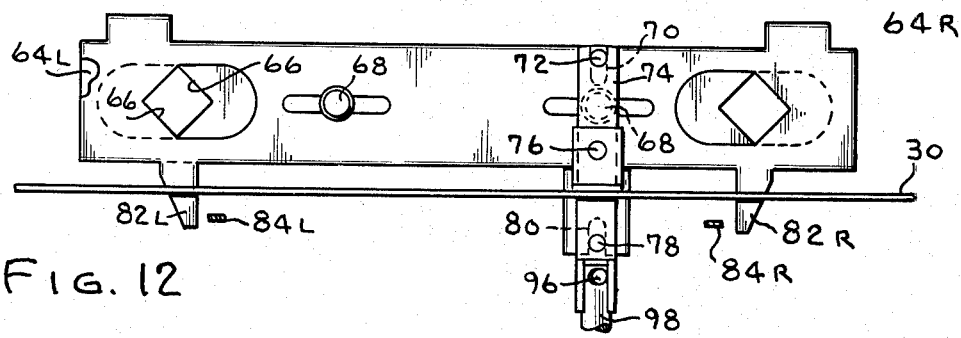
Figure 13:
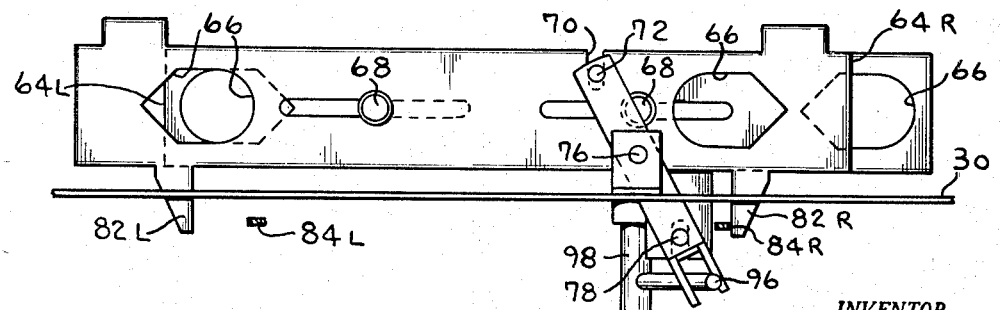

The shutters are illustrated in FIGS. 10 through 13 as well as also appearing in FIG. 1. The shutters 64L and 64R are flat strips of thin metal provided with apertures 66 at each end and guided on pins 68 projecting forwardly from the housing as may be seen in FIG. 1. In the position shown in FIG. 10 the apertures 66 in the two shutters are aligned on the right to provide a circular opening permitting projection through the aligned apertures whereas the left side apertures are out of register and, hence, no image can be projected and that optical system is blanked out. It will be noted that the front shutter 64R is provided with a slot 70 engaged by a pin 72 carried by a rocking lever 74 which pivots about pivot 76. The lower end of lever 74 is provided with a pin 78 engaging slot 80 in the tab depending from shutter 64L. As this lever rocks it will move the shutters with an overlapping, sliding motion. Thus, in FIG. 11 the motion has just started and it will be noted that the two apertures 66 on the left side of the shutter mechanism have just started to overlap which will mean that a very slight image will now be projected through this side whereas on the right side the full image can still be projected. In FIG. 12 the rocking lever 74 has assumed a vertical position and the overlapping apertures are now diamond shaped on each side and if the shutter mechanism is stopped at this point (as can be done, as will be explained more fully hereinafter) the images from both projection systems will appear on the screen in superimposed fashion. In FIG. 13 the rocking lever has continued its motion to now open the left side fully and close off the right side.

Figure 8:
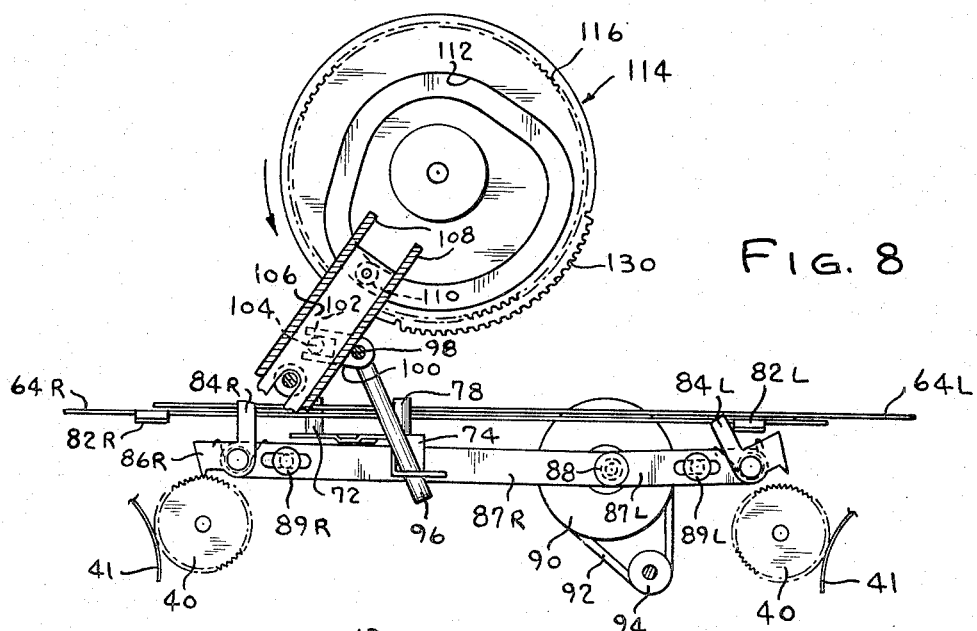
FIGS. 8 and 9 are again fragmentary in order to illustrate the manner in which the timing cam controls selection of which lens will be focused independently of the other with the same timing cam being employed to actuate the shutter mechanism which only appears in part.
Figure 9:
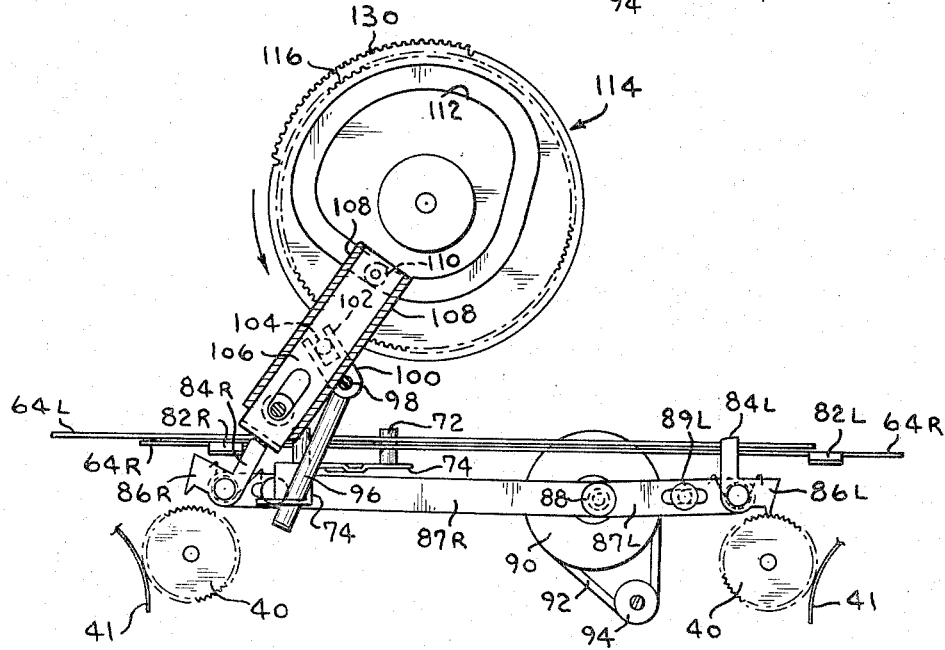
Figure 10:
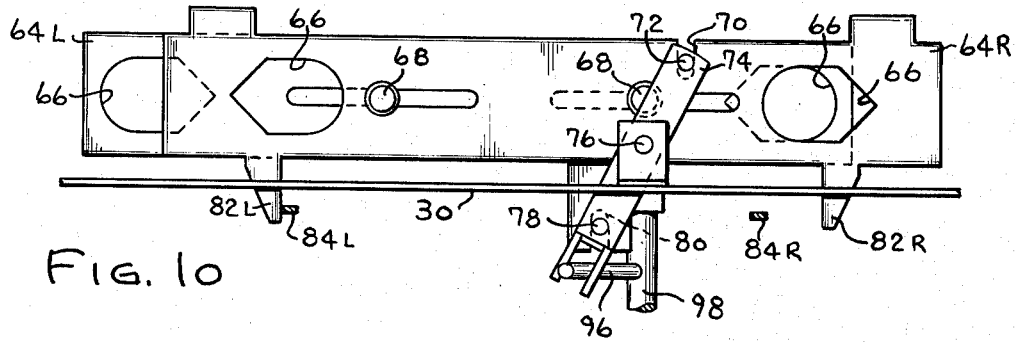
FIGS. 10, 11, 12 and 13 are fragmentary views illustrating the manner in which the shutters are controlled and in part rely on FIGS. 8 and 9 to show the manner in which the timing cam achieves actuation of the shutters.
Figure 11:
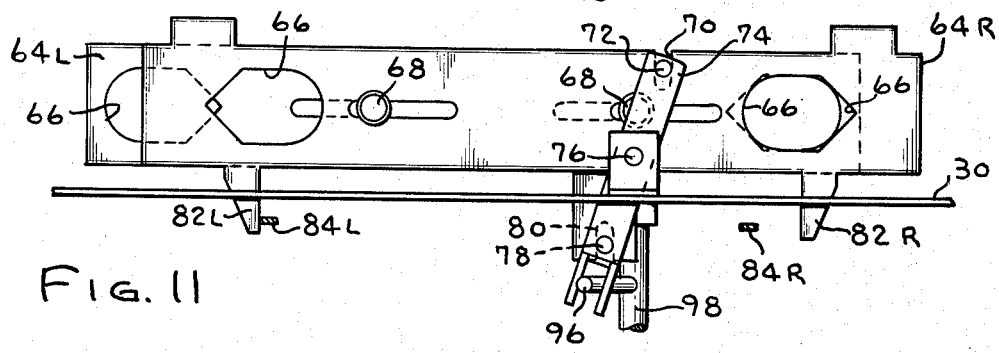

FIGS. 10 through 13 additionally show a portion of the fine focus adjustment mechanism in that the depending arms 82L and 82R on the front shutter 64R are shown contacting, or able to contact, the rearwardly projecting arms 84L and 84R of cranks 86L and 86R which appear in greater detail in FIGS. 8 and 9. The cranks are pivotally carried on links 87L and 87R which are guided on pins 89L and 89R for linear motion. The links 87 are pivotally interconnected at 88 and the pivotal connection is driven by an eccentric drive from pulley 90 driven through belt 92 by motor pulley 94. This motor is energized when it is desired to adjust the focus over a small range of the lens in use at the moment. Each crank 86 is biased to project its drive pawl into contact with gear 40 and the shutter arms 82 are employed to determine which pawl will be able to engage its associated gear 40. Thus, in FIG. 10 the shutter arm 82L is engaging the arm 84L to move the pawl out of engagement with gear 40 while allowing the other crank pawl to engage its associated gear. This is shown in FIG. 8 whereas reverse condition obtains in FIG. 9. When the motor is energized to drive pulley 90 both links reciprocate and the pawl which is engaging the gear 40 can now turn this gear to adjust the focus as mentioned above. Reverse motion of each gear 40 is prevented by the leaf spring 41 bearing against the gear to impose a drag on it. When the shutters are actuated to change projection systems it will be obvious the fine focus mechanism also changes so that it will be operative on the other system and leave the one not in use unaffected by any actuation of the focus mechanism.

FIGS. 10 through 13 show that the rocking lever 74 derives its motion from arm 96 projecting from the vertically mounted oscillatable shaft 98. This shaft also appears in FIGS. 8 and 9 and, as can be seen therein, this shaft carries a drive member 100 having a forked end 102 engaging pin 104 carried by the slide member 106 which is guided in parallel ways 108. The slide is provided with a cam following pin 110 which projects into the face cam or groove 112 provided in the master timing cam and gear 114. As cam and gear 114 rotate it thus controls the actuation of the shutters and of the fine focus adjusting mechanism, as may be clearly seen by a comparison between FIGS. 8 and 9.

In a sense, the master timing cam and gear 114 constitutes the heart of proper synchronization and control of the present projector. In FIGS. 8 and 9 it will be noted that the same face of this cam and gear that is provided with the cam groove 112 is provided with a continuous gear 116 near its perimeter. This gear 116 is driven by pinion 118 carried on a common shaft with idler 120 which engages pinion 122 fixed on pulley 124 driven by changer motor 126 through belt 128. Thus, whenever the changer motor is energized it will drive this pulley and gear train to rotate the master timing cam and gear 114 in either direction since the changer motor can be driven in a forward or reverse sense. The perimeter of the master cam 114 is provided with an interrupted gear 130 which is adapted to control the slide changer mechanism in properly timed sequence with respect to the actuation of the shutters. Referring to FIG. 17 it will be seen that the actual changer per se is broadly a conventional type provided with an arm 132 which can reach through the back side of the slide magazine 134 to push a slide out of the magazine into the projection stage which is the position occupied in FIG. 17 although the slide does not appear in this figure since the view has been taken to illustrate other details of construction as well. The return arm 134 will pick up the slide from the projection stage and return it to the slide magazine as the entire changer bar 136 moves to the left from FIG. 17 to the position shown in FIG. 18. At this point the magazine should be indexed one step to place the next slide in position to be picked up by arm 132 and be moved to the projection stage as illustrated in FIG. 19. It will, incidentally, be noted that FIGS. 18 and 19 both illustrate the actual projection stage with slide 137 also appearing in FIG. 19 in the projection stage while in FIG. 18 it appears in dotted line position.

This type of slide changer, as described to the point, is not new but it will be noted that the present changer base is provided with a depending pin 138 which projects through the floor 140 for engagement by and with the spring metal control arm 142. This arm appears in greater detail in FIGS. 14, 15 and 16 to the left-hand portions of which, incidentally, correspond to FIGS. 17, 18 and 19 respectively. Thus, in FIG. 14 the changer pin 138L is in the front which means that the slide is in the projection position. When the changer motor is actuated the master cam and gear 114 will start to rotate in a clockwise direction and during about the first 90 degrees of motion the interrupted portion 144 on pinion 146 will ride on the smooth portion of the master gear and cam 114. During this motion the shutters are actuated so that the left-hand slide is no longer showing on the screen and the right-hand slide is showing. It is now the proper time to change the slide on the left-hand side of the projector. At this point the interrupted gear 130 comes into contact with pinion 146 and initiates counterclockwise rotation of gear 146 about its pivot point 148. This will cause arm 150 fixed with respect to gear 146 to rotate about pivot 148 and pull link 152 towards the rear of the projector to result in arm 154 also moving to the rear about its pivot shaft 156 to which the resilient changer arm 142 is fixed. This motion will continue until the parts reach the position shown in FIG. 15 in which the changer for the left slide has been fully retracted. At this moment the magazine should be indexed and the slide changer will then resume its forward motion (actually a continuous action except for the reversal of direction) to bring the next slide into projection position as shown in FIG. 16. In FIG. 16 the interrupted gear portion 130 has run on past the pinion 146 and the changer motor 126 is now cut or de-energized by controls to be described hereinafter. On the next actuation of the changer motor it will be apparent the right-hand slide changer would be the one to be actuated.

As mentioned above, when the slide changer reaches the positions shown in FIGS. 15 and 18 it is necessary to index the magazine. This motion is controlled by the master timing cam and gear 114 since the pinion 146 carries a trip arm 158 provided with a pin 160 which will be rotated with the pinion. When the pin 160 reaches a position approximately 180 degrees away from that illustrated in FIG. 14 it will strike, and index one step, star wheel 162. This star wheel also appears in FIG. 17 and, as can be seen there, it is mounted on a shaft 165 the upper end of which carries a gear 166 which is adapted to engage rack 168 on the underside of the magazine to control the indexing thereof. The star wheel 162 appears in FIGS. 25 and 26 and when the projector is set up to project slides the parts will appear as shown in FIG. 26. Here it will be noted that each star wheel 162 is engaged by a roller 164 carried on the end of an arm 167 pivoted at 169 and biased toward the star by a spring coiled around the pivot shaft (not shown since this would tend to confuse the drawing). Thus, as the pin 160 comes around and hits one of the points on star 162 the star 162 will make but one step and the roller will be driven back by the spring biasing it into the valley between the teeth as shown in FIG. 26. The arms are interconnected by a rod 170 permitting motion of either arm 167 with respect to the rod by reason of the slotted connection between the rod 170 and the arms.

The gears driven by the star wheels 162 are, when the projector is set up for projection as in FIG. 26, properly oriented with respect to the rack on the underside of the magazine to properly drive the magazine. The angle of the gear teeth to the rack teeth is, however, wrong for purposes of sliding the magazine into its position in the projector in that the teeth would tend to hit in such a manner as to preclude rotation of the gear 166. To take care of this, as well as some other functions which will be described hereinafter, the projector is fitted with a knob 172 which is rotatable between "project" and "load" positions. In FIG. 26 it is in the "project" position. When the knob is rotated to the "load" position as shown in FIG. 25 an arm 174 carried by the shaft of the knob moves the end of link 176 to the right from the FIG. 26 to the FIG. 25 position. This accomplishes two things. For one thing, it actuates the snap switch 178 by reason of the engagement with the actuator arm 180. The purpose of this switch will be described more fully hereinafter. Of more immediate concern to the present discussion is the fact that when the link 176 moves to the right it takes with it the pivot point 181 to rock the inverted T-shaped lever 182 about its pivot 184. This will elevate the pivotal interconnection between lever 182 and lever 186 so that the parts now assume the position shown in FIG. 25. It also brings the bumper 188 against face 190 of crank or arm 167 to rotate the crank in a counterclockwise direction and cause similar rotation of arm 167 by reason of the motion transmittal through link 170. This now brings the rollers 192 carried by arms 194 (loosely mounted on pivots 169 and biased towards the more strongly biased arms 167 by tensioned springs 196) into engagement with the valley. This will cause a slight but perceptible rotation of the magazine drive gear 166 so as to place it in position permitting easy insertion of the magazine. The rocking of the ends of levers 182, 186 from a rearwardly disposed position in FIG. 26 to a forwardly disposed position in FIG. 25 serves to actuate changer disengagement bars 198L and R.

FIGS. 20 through 24 show the manner in which these changer disengagement bars 198 operate. For the sake of simplicity let us here refer to changer bar 198L which is mounted on the housing floor and projects through the floor to have an arm portion 200 engaged by the end of lever 186 described above. To the right of FIG. 20 note a fragment of the changer 136 with the depending pin 138 engaged by the resilient actuator 142. In the position shown in FIG. 20 the slide is in its normal projection position and in the position shown in FIG. 21 the changer actuator 142 has moved to retract the slide into the magazine. In this retracted position note there is no cooperation or coaction between the changer disengagement mechanism and the changer actuator 142. However, when the changer disengager 198L is moved forward the inclined or cam face 201 thereof now has moved forwardly far enough so that it lies in the path of the bent portion 202 of the changer actuator 142. The two surfaces coact, as shown in FIG. 22, so that the straight portion of 204 of the actuator is free to drive the changer all the way back to its retracted position but the forward face of the turned up part 202 (which face normally provides the return force to the changer pin 138) is held away from the changer pin 138. Therefore, when the master cam and gear continues rotation to move the changer actuator 142 forward to the position in FIG. 23 the changer will be left in the rear position and the pusher arm 132 of the changer has now been cleared from the magazine. In the "load" position both of these arms are retracted so as to open up the passageway for the magazine to permit unimpeded motion of the magazine for loading into or removal from the projector. When knob 172 is returned to the "project" position the actuator disengager 198 is pulled back to the left as shown in FIG. 24 so that when the changer is actuated the actuator 142 coming back, as illustrated in FIG. 24, will be cammed out until it snaps over the changer pin 138 and can then pick up the changer for movement of a slide into projection position on the return motion of the actuator.

As this description has proceeded it will have occurred to the reader that during the time one slide is being shown the other slide is being changed and this necessitates that the magazine be indexed one step to permit the change. However, at the same time the slide in the projection position is positioned in such position by the pusher arm 132 which projects through the magazine and the magazine can't be indexed at the projection stage. In order to overcome this problem the present invention uses what might be designated a split magazine or slide tray. Thus, the left section 206 of the magazine is connected to the right section 208 by means of a lost motion connection. Thus, the metallic strap 210 is fixed to section 206 and extends over the right-hand section 208, around the end thereof, and back underneath the sections in a similar manner. The end of this loop is, however, spaced with respect to the end of section 208 if the section 208 is positioned against section 206. Therefore, as shown in FIG. 49 with the pusher arm 132 passing through section 208, section 206 can be indexed one step towards the left to allow the left-hand pusher bar 132 to pick that slide up and move it forward into the projection stage. On the next sequence the section 208 would "catch up" with section 206. By interconnecting the two sections 206, 208 with a predetermined amount of available lost motion it is a simple matter to insure inserting the combined units into the projector so as to insure the proper sequence of slide showing. It will be remembered that the first picture to be shown comes from one section while the next from the other section and the third from the first section, and so on. If the two sections 206, 208 were completely disconnected there would be no way, other than trial and error, to achieve the proper sequence of slides. The lost motion between the sections is at least equal to the space between adjacent slide receptacles in a section and is less than the space between two receptacles. In practice the spacing is about midway between these limits.

Figure 2:
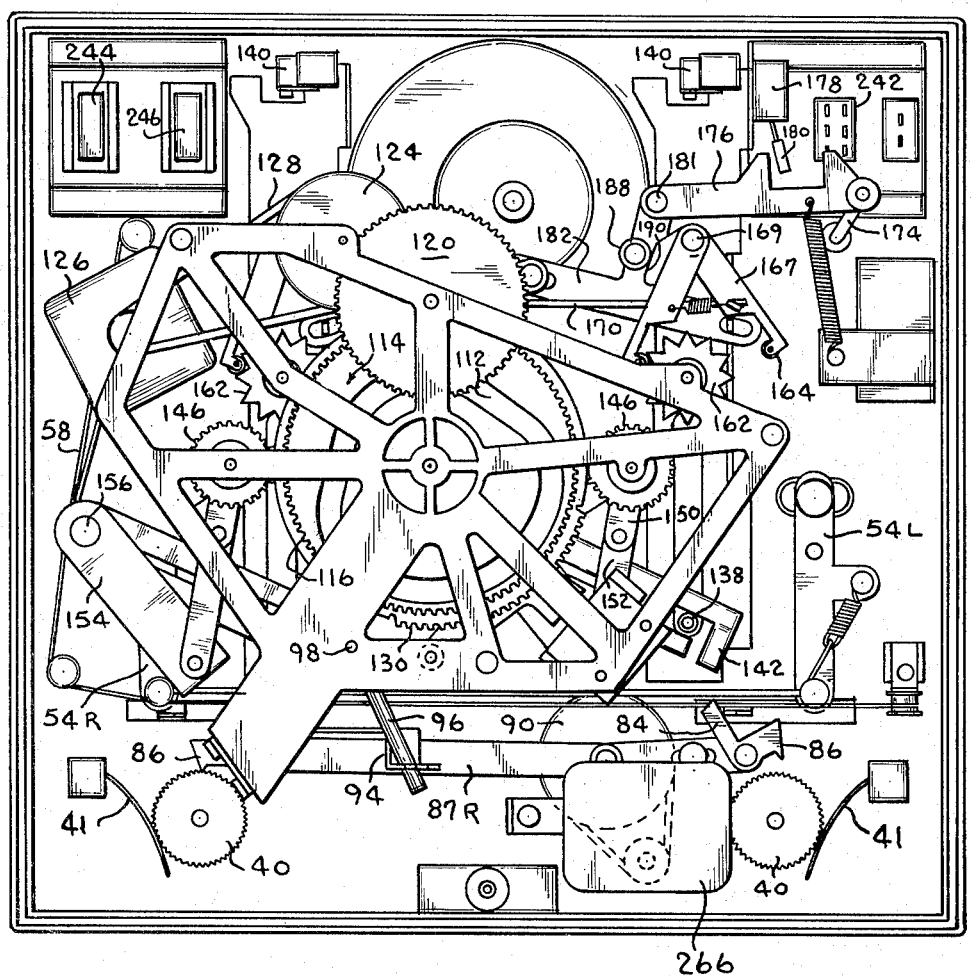
FIG. 2 is a bottom view of the projector with the bottom cover removed.

With the foregoing considerations in mind it will be apparent that the slides in one section will be respectively 1, 3, 5, etc. while the slides in the other section will be slides 2, 4, 6, etc. From the above considerations it will also be apparent that during normal forward sequencing of the slides the master cam and gear must make a 180 degree revolution for each slide change. The timing cam and gear is also employed to insure the proper running time of the timing cam and gear. The surface of cam and gear 114 on the other side of that appearing in FIG. 2, in other words, the top surface of the cam and gear is provided with four limit posts A, B, C and D and is also provided with two pointed cam arms 212, 214 mounted on pivots 216 and interconnected by the tensioned spring 218 to normally assume the radially disposed position shown in FIG. 28. FIG. 27 shows the position occupied at the end of one change cycle and in this position the cam arm 212 has been wedged between post A and the roller 220 on the pivotally mounted switch actuator 222 to open the normally closed switch 224. On the next cycle of operation the timing cam and gear 114 rotates in the direction indicated by the arrows on FIG. 28 to allow the normally closed switch 224 to close and stay closed until the cam 214 becomes wedged between the switch actuator and post C, that is, until the cam rotates 180 degrees. This switch is used as a holding switch with the change cycle initiated by momentary closure of an index switch.

A moment's reflection on the sequencing of this control will make it readily apparent that the act of reversing the sequence of the slides involves some complications. For example, suppose that you are now projecting slide No. 4. This means that slide No. 5 is already in position to be shown on the next forward step of the projector. If you now decide you wish to go back to slide No. 3, that is, the slide preceding No. 4 which is now showing, you have an obvious problem of avoiding showing slide No. 5. In other words, on initiating a reversal it is necessary to first remove slide No. 5 and return slide No. 3 to the projection stage and then switch from slide No. 4 to slide No. 3. Therefore, while the normal 180 degree rotation of the timing cam and gear is devoted in its first 90 degrees of motion to shutter actuation and in the last 90 degrees to slide changing it would be necessary on reversing to first change slide No. 5 for slide No. 3 and then actuate the shutters and, following the shutter actuation, another 90 degrees is needed to change the previously shown slide No. 4 for slide No. 2. Thus there is a requirement for 270 degrees of rotation of the timing cam and gear on reversal of motion. This is accommodated by the same arrangement shown in FIGS. 27 and 28.

Assume the FIG. 27 position. To reverse the sequence so that the cam and gear rotates in the direction of the arrows in FIG. 29, the first thing this will do is relieve the switch 224 for closure and it will not be reopened until cam 214 wedges between the switch actuator and post B, it being clear that cam 212, on initiation of the motion, moves between the roller and the post and the next available cam to actuate the switch is cam 214.

Also appearing on FIGS. 27, 28 and 29 is a switch 226 which is actuated by the slide 106 (more fully described in conjunction with FIGS. 8 and 9 and the shutter mechanism) to sense the shutter position. The switch is opened when the shutter mechanism is situated to project through the left-hand lens (when viewed standing behind the projector) which will project the first slide. This sensing switch is tied with the wiring circuit and the "load" and "project" switch to insure that the projector will go into operation with a minimum of fuss and bother after loading the projector and to insure that it will project the first slide first.

Before going into detailed explanation of the wiring diagram it would be advantageous to amplify the description of the operational sequence illustrated in FIGS. 31 through 48. These figures have previously been described, in conjunction with the description of the views in the drawings, in rather considerable detail since it was felt that this gave a sense of direction and understanding to this specification. Therefore, this operational sequence will not be redescribed here in all the various facets other than to amplify on certain phases of the foregoing description.

In FIG. 31 the projector is set up for loading and it will be seen that both slide pusher bars have been retracted to allow loading of the projector. As mentioned immediately above the shutter sensing switch 226 in FIGS. 27, 28 and 29 senses that the left shutter will be open in the load position. Moving the control knob now from "load" to "project" occasions, in rapid order, the sequence shown in FIGS. 32 through 35 and again it will be noted that, by reason of the sequence, the No. 1 slide is now being projected and this, in turn, goes back to that shutter sensing switch mentioned above. In FIG. 43 the start of the reversing operation is depicted and this sequence, in FIGS. 43 through 48, will make more clear the necessity of the 270 degrees rotation of the cam and gear upon reversal of the feed and the earlier description of this sequence may now be profitably reviewed.

All of these various operations are interlocked electrically so that operator error cannot cause damage to the projector. One mechanical interlock is provided, however, and this is in connection with the removable projection stage. Each projection stage comprises a removable body 228 mounted in cooperating guideways 230, 232 (FIG. 18) for vertical motion into and out of projection position. The body is provided with horizontally disposed guideways 234, 236 to receive a slide in the projection stage. If it is desired to edit a slide (by way of turning the slide upside down, or reversing it, or the like) the entire body 228 can be removed when the changer is in the projection position. It will be noted that the slide changer has the usual slide return bar 134 (previously described) and this bar is provided with a downwardly projecting stop 238 which will overlie the bottom slide guideway 234 when the changer is in the retracted position (as in FIG. 18). This will prevent removal of the projection stage body 228 when the changer has been moved to the "load" position which is the position it would normally occupy when the projector is being carried and the like. Hence, this will prevent the projection stages from falling out of the projector as the projector is being transported.

FIGS. 17 through 19 also show the remaining switches to be described in that each changer is adapted to actuate single pole, double throw switches 240 at the end of the retraction motion (as in FIG. 18). In other words, switch 240 will make one circuit when the changer is in the projection position and will make a different circuit when it is in retracted position. These switches are used to sense the position of the changers so as to determine whether the machine is set up for projection or for loading.

FIG. 53 is the wiring diagram for the present projector and it will be noted the projector portion of the wiring is enclosed in a dashed block and a second dashed block shows the remainder of the wiring which is preferably housed in a hand-held, "remote" unit. Both the projector and the remote unit are provided with connector blocks 242 and in describing this circuit it will be best to consider these blocks connected (as they would be in practice). Input across L-1 and L-2 is controlled by master switch 244 and the projection lamp is controlled by switch 246 which will place the lamp directly across the line if the master switch has been previously closed. Closure of the master switch will also close the circuit through the blower (cooling) motor through junction 248, lines 250, 252, 254 and through the blower motor winding to L-1. It will be noted that this winding is provided with a tap 256 providing a low voltage, through line 258, to the pointer lamp 260 controlled by switch 262.

Closure of the master switch 244 also provides power through line 252 and focus switch 264 to the focusing motor 266 as well as providing power to the index switch 268. Closure of the index switch under the conditions illustrated will establish a circuit through the index switch, holding switch 270 and reversing switch 272 to go through either the forward or reverse winding of changer motor 274. As soon as the changer motor 274 starts operation the timing cam will allow cycle switch 224 to close so that upon release of the index switch the cycle switch 224 will continue energization of the changer motor. As mentioned in connection with the shutter operation, it is sometimes desirable to superimpose the images. In order to do this the change cycle must be stopped by opening normally closed hold switch 270 to deenergize the changer motor until the hold switch is released for closure. The change cycle, if not interrupted by the hold switch, will continue until the cycle switch is again opened by the master timing cam and gear. If the "project"-"load" knob 172 is actuated to, in turn, actuate switch 178 to the "load" position from the "project" position a circuit will be established to the changer motor through switches 240 since they, at the start of this operation, were in the projection position and, hence, occupied the position shown in full lines. This will now hold the circuit through the changer motor until both switches 240 have been moved to the dotted line position [indicative of the slide changers being in the "load" (or retracted) position] and the shutter sensing switch 226 has been moved to the position indicating the left shutters are open. In other words, switches 240 and 226 must be opened (as must cycle switch 224, of course). After the projector has been loaded, turning the knob back to "project" will now obviously energize the projector and changer motor 274 with no further operation on the part of the user since the switches 240 are then in a dotted line position. Now the changer motor must drive through a sequence to break the circuit through each of the switches 240 at which time both slide changers will have been moved to the projection position with slides in projection position and the left shutters open ready to show slide No. 1.

The present projector can be adapted for fully automatic operation by the addition of the structure illustrated in FIG. 54. This is a plan view showing a construction in which blower motor drives through belt 278 to pulley 280 to turn pinion 282 and drive gear 284 which has an eccentric pin 286 mounted thereon to engage slot 288 in lever 290 pivoted at 292. The other end of the lever is provided with a drive pin 294 which is adapted to move arm 296 to the extreme position illustrated in dotted lines in this figure. This movement of arm 296 is against the bias of a hair spring 298 which biases the arm back towards a limit pin 300 carried by timing adjusting arm 302 which is also pivoted on axis 292. This arm is resiliently held in its set position by the force of compressed spring 304 mounted below the plate 306 to set up a drag on movement of the arm. If the arm is moved to the extreme rear position in FIG. 54 the fastest timing is achieved whereas the extreme forward position is the slowest timing. All that this does is determine the stroke available to arm 296.

Stroking arm 296 from pin 300 towards the dotted line position serves to wind up spring 308 on shaft 310 to rotate the shaft in a counterclockwise direction as viewed at FIG. 54. As the arm 296 goes back towards its biased position anti-reverse spring 312 prevents such back motion of the shaft. This shaft 310 carries with it (below plate 306) a cam 314 having a recessed portion 316 into which the follower 318 may fall to allow the normally open indexing switch 320 to close and accomplish the same function as closure of the manual indexing switch in the previous construction. Therefore, at a predetermined time interval the indexing switch will be closed and the slide will change. This by itself renders the projector fully automatic and the projector can be provided with a manually operable switch 322 to selectively place this automatic indexing mechanism into operation or to place the indexing under manual control as before.

Automatic reversal at the end of a desired sequence can be achieved by actuating the slide bar 324 having limit stops 326 adjustably mounted thereon for actuation by a tab projecting from a dummy or actual slide placed in the magazine. This tab can be made as designated by 328 in FIG. 58. The pins 325 on the bar actuate reversing switch 327 by means of arm 329.

With this arrangement, therefore, the projector can be made completely automatic including automatic reversal at the end of a sequence. Obviously some sequences would not be desirable if reversed in the usual sense and for this reason it would be desirable to have half the sequence operable on motion in one direction and the other half operable or effective during the reverse direction. In order to accomplish this one needs simply to change the amount of indexing given the slide tray during the changing operation. In other words, instead of taking the next slide you skip the next slide and take the one following that and "pick up" the skipped slides on the return motion by making provision for lost motion on reversal. Therefore, this type of projector can be set up to give a continuous, repeating slide show in an unattended booth or the like.

Although but two embodiments of the present invention have been illustrated and described, it will be apparent to those skilled in the art that various changes and modifications may be made therein without departing from the spirit of the invention or from the scope of the appended claims.

I claim:

1. A slide projector comprising, a body provided with two projection systems each including a projection lens and a slide stage to allow projection of two separate images on spaced generally parallel axes, shutters associated with each system to control passage of light, means for actuating the shutters in synchronism to close the shutters on one system when the shutters on the other system are open, means for focusing each lens, power means having a driving connection to each focusing means, and means responsive to the operational condition of the shutters to render inoperative the driving connection to the lens closed by its associated shutter whereby only the lens in use is focused.

2. A projector according to claim 1 in which the driving connection includes a reciprocating drive pawl engaging a driven gear, said driven gear having a driving engagement with the lens, said responsive means including a connection between the shutters and the pawl to move the pawl out of engagement with the gear.

3. A projector according to claim 1 which is provided with a single light source and each projection system includes a mirror reflecting light to the lens from the source, each mirror being mounted for movement with respect to its associated projection system to alter the lens-to-film distance and adjust the focus.

4. A projector according to claim 3 including means for simultaneously moving both mirrors to simultaneously focus both systems.

5. A projector according to claim 3 including switch means for sensing the operational state of the shutters.

6. A projector comprising, a housing enclosing two projection systems each of which includes a slide stage and a projection lens, shutter means operative to determine which of the two systems will be effective to project an image with the systems alternating in operation, a slide magazine associated with each slide stage, a changer associated with each slide stage and each operative to advance a slide from the magazine to the associated stage and subsequently retract the slide to the magazine, drive means for operating the shutter means and the changers, said drive means being operative on each operational cycle to return the slide not then being projected to the magazine and return to the slide stage the slide next to be projected from that stage and also being operative to operate the shutter means to change from one system to the other, each changer including an arm which passes through the magazine when the changer has advanced a slide to the slide stage, control means movable from a normal position to a "load" position and operative to disengage the drive means from the changers when the changers are retracted, said control means including means sensing the position of the changers to continue operation of the drive means until both changers are retracted.

7. A projector according to claim 6 including means sensing the operational state of the shutter means and operative when the control means is in said "load" position to continue operation of the drive means until the shutter means is in a predetermined operational state.

8. A projector comprising, a housing enclosing two projection systems each of which includes a slide stage and a projection lens, shutter means operative to determine which of the two systems will be effective to project an image with the systems alternating in operation, a slide magazine associated with each slide stage, a changer associated with each slide stage and each operative to advance a slide from the magazine to the associated stage and subsequently retract the slide to the magazine, said magazines being interconnected by a lost motion connection allowing motion of either magazine part while the other is stationary.

9. A projection comprising, a housing enclosing two projection systems each of which includes a slide stage and a projection lens, shutter means operative to determine which of the two systems will be effective to project an image with the systems alternating in operation, a slide magazine associated with each slide stage, a changer associated with each slide stage and each operative to advance a slide from the magazine to the associated stage and subsequently retract the slide to the magazine, a rotatable disc having means thereon for operating the changers and the shutter means, the disc rotating about 180 degrees to operate the shutter means and one of the changers, the subsequent 180 degree rotation of the disc operating the shutter means and the other changer, an electric motor for rotating the disc, an electric circuit including a switch for energizing the motor, and cycle timing means carried by the disc including a holding switch for continuing the energization of the motor for 180 degrees of rotation of the disc.

10. A projector according to claim 9 in which the shutter means is operated during the first part of the disc rotation and the changer is operated during the remainder of the 180 degrees of rotation, said projector including means for advancing the associated magazine when the changer is retracted to enable the changer to subsequently advance to the slide stage the next slide in the desired sequence, said circuit including switch means for reversing the sequence of slide projection, said cycle timing means being operative upon the next energization of said motor subsequent to operation of the reversing switch means to cause the disc to rotate about 270 degrees whereby the disc operates the changer last operated and then operates the shutter means and then the other changer.

11. A projector according to claim 10 including manual means positionable to cause disengagement of the disc and changers when the changers are retracted, switch means operated by the manual means to establish an alternate circuit for said motor, and switch means sensing the position of the changers to continue energization of the motor following operation of the manual means until both changers are retracted.

12. A projector according to claim 11 including switch means in the alternate circuit and sensing the operational condition of the shutter means to continue the motor operation until both changers are retracted and the shutter means is in a predetermined operational condition.

13. A projector according to claim 12 in which movement of the manual means to its inoperative position operates the switch means to energize the motor to rotate the disc until both changers have been re-engaged and advanced to their normal projection positions.

14. A projector according to claim 9 including focus means for each lens, a focus motor, and drive means controlled by the disc to connect the focus motor to the focus means associated with the lens through which the shutter means allows light to pass.

15. A slide projector including a housing having a slide stage in which a slide is positioned during projection thereof, said stage being removably mounted in the housing for insertion and removal through a side of the housing, a slide changer for moving slides to and from the stage, a stop carried by the changer and positioned to overlie a portion of said stage when the changer is positioned for removal of a slide from the stage to prevent removal of the stage.

16. A slide projector comprising, a housing containing a light source emitting two beams in opposite directions, a slide stage in each beam, a mirror for reflecting each beam to result in two generally parallel beams, a slide magazine containing the slides for both stages and positioned parallel to the oppositely directed beams, and a changer for each stage and operative to transport slides between the magazine and the stage associated therewith.

17. A projector according to claim 16 in which the magazine has two sections each having receptacles for a plurality of slides, said sections being interconnected for limited relative motion.

18. A projector according to claim 16 including means associated with each changer for advancing the magazine during operation of the changer, and means for operating the changers alternately.

19. A projector according to claim 18 including shutter means operated in synchronism with the changers so that one slide is projected while another is changed.

20. A slide magazine having two sections each including a plurality of receptacles for slides, said sections being interconnected by means allowing limited motion of the sections with respect to each other, the limited motion being at least equal to the space between sequentially adjacent receptacles in a section but less than the space between two sequentially adjacent receptacles.

References Cited by the Examiner
UNITED STATES PATENTS

| | | | |
|---|---|---|---|
| 1,141,885 | 6/15 | Palmer | 88—26 |
| 1,365,752 | 1/21 | Vischer | 88—28 |
| 1,729,304 | 9/29 | Wagner | 88—28 |
| 2,525,598 | 10/50 | Gruber | 88—26 |
| 2,569,875 | 10/51 | Waller | 88—26 |
| 2,709,401 | 5/55 | Jaros | 95—18 |
| 2,784,817 | 3/57 | Lessman | 192—28 |
| 2,805,503 | 9/57 | McKee et al. | 40—79 |
| 2,900,074 | 8/59 | Windman | 206—62 |
| 2,909,962 | 10/59 | Goldberg | 88—28 |
| 2,973,689 | 3/61 | Bailey | 88—28 |
| 3,025,759 | 3/62 | King | 88—28 |
| 3,093,030 | 6/63 | Carillo | 88—28 |

FOREIGN PATENTS 15,643   1894   Great Britain.

EVON C. BLUNK, *Primary Examiner.*

WILLIAM MISIEK, *Examiner.*